United States Patent
Howe et al.

(10) Patent No.: US 9,505,153 B2
(45) Date of Patent: Nov. 29, 2016

(54) REUSABLE CARTRIDGE FOR INJECTION MOLDING

(71) Applicant: RADIUS ENGINEERING INC., Salt Lake City, UT (US)

(72) Inventors: Matt Howe, Salt Lake City, UT (US); Dimitrije Milovich, Salt Lake City, UT (US)

(73) Assignee: Radius Engineering, Inc., Salt Lake City, UT (US)

(*) Notice: Subject to any disclaimer, the term of this patent is extended or adjusted under 35 U.S.C. 154(b) by 390 days.

(21) Appl. No.: 13/766,773

(22) Filed: Feb. 13, 2013

(65) Prior Publication Data

US 2014/0117571 A1    May 1, 2014

Related U.S. Application Data

(60) Provisional application No. 61/598,295, filed on Feb. 13, 2012.

(51) Int. Cl.
| | | |
|---|---|---|
| *B29C 45/03* | (2006.01) | |
| *B29C 45/07* | (2006.01) | |
| *B65D 83/00* | (2006.01) | |
| *B29C 70/48* | (2006.01) | |
| *B29C 45/17* | (2006.01) | |
| *B29L 31/00* | (2006.01) | |

(52) U.S. Cl.
CPC ............ *B29C 45/036* (2013.01); *B29C 45/07* (2013.01); *B29C 45/1753* (2013.01); *B29C 70/48* (2013.01); *B65D 83/0022* (2013.01); *B29L 2031/7678* (2013.01)

(58) Field of Classification Search
CPC .................................................. B29C 45/036
See application file for complete search history.

(56) References Cited

U.S. PATENT DOCUMENTS

| | | | |
|---|---|---|---|
| 4,528,150 A * | 7/1985 | Charlebois | B29B 13/022 264/328.19 |
| 4,969,877 A | 11/1990 | Kornberg | |
| 5,187,001 A | 2/1993 | Brew | |
| 5,626,566 A | 5/1997 | Petersen | |
| 6,136,236 A | 10/2000 | Boccard | |
| 2005/0045665 A1 * | 3/2005 | Krzywdziak | B44D 3/127 222/469 |
| 2009/0137964 A1 | 5/2009 | Enggaard | |

FOREIGN PATENT DOCUMENTS

| | | |
|---|---|---|
| EP | 0212437 A2 | 3/1987 |
| EP | 0554995 A1 | 8/1993 |
| EP | 2274029 B1 | 2/2011 |

* cited by examiner

*Primary Examiner* — Benjamin Schiffman
(74) *Attorney, Agent, or Firm* — Amy Fiene; James Sonntag

(57) ABSTRACT

Reusable cartridges allow the time consuming resin preparation and processing steps to occur offline and not affect the cycling time of the injector. Cartridges also greatly simplify the operation of RTM injectors as preparation simply consists of loading a warmed ready-to-use resin cartridge and performing the injection.

17 Claims, 12 Drawing Sheets

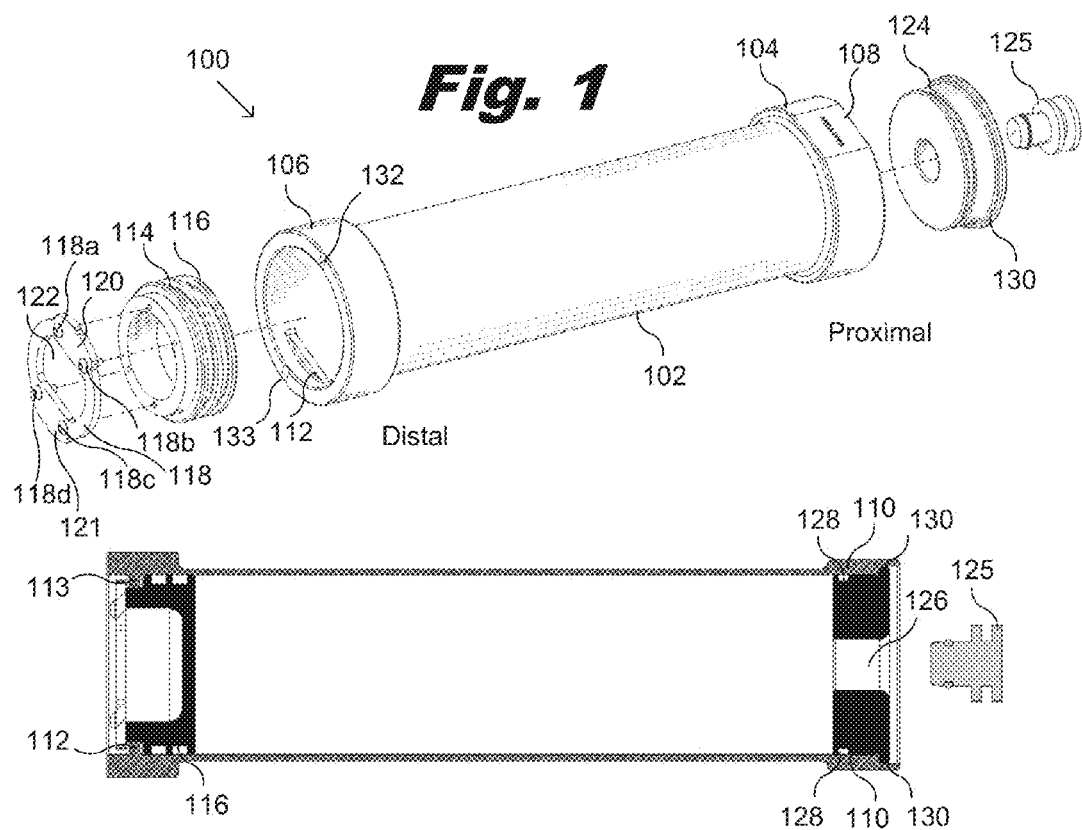
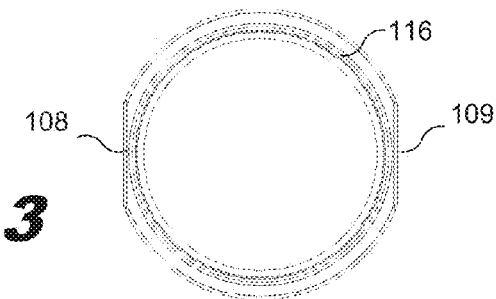

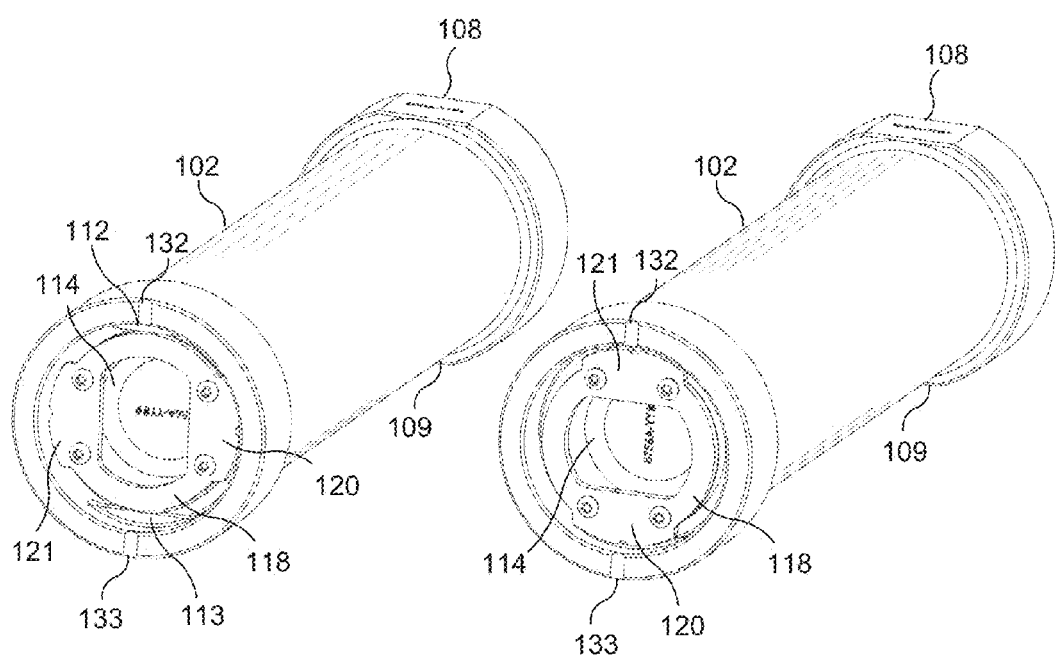

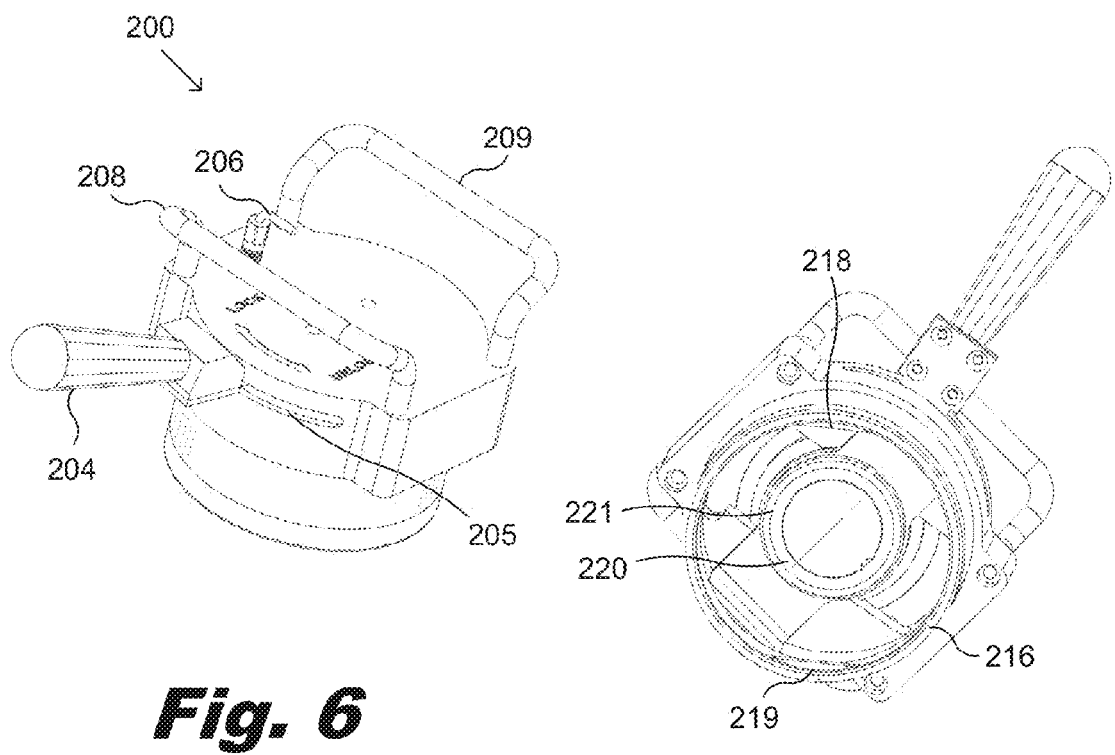

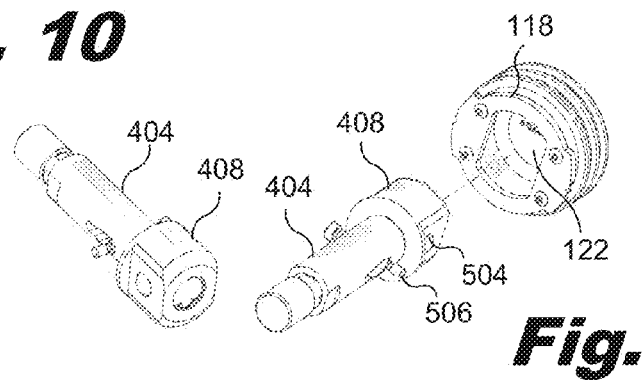
Fig. 10
Fig. 11
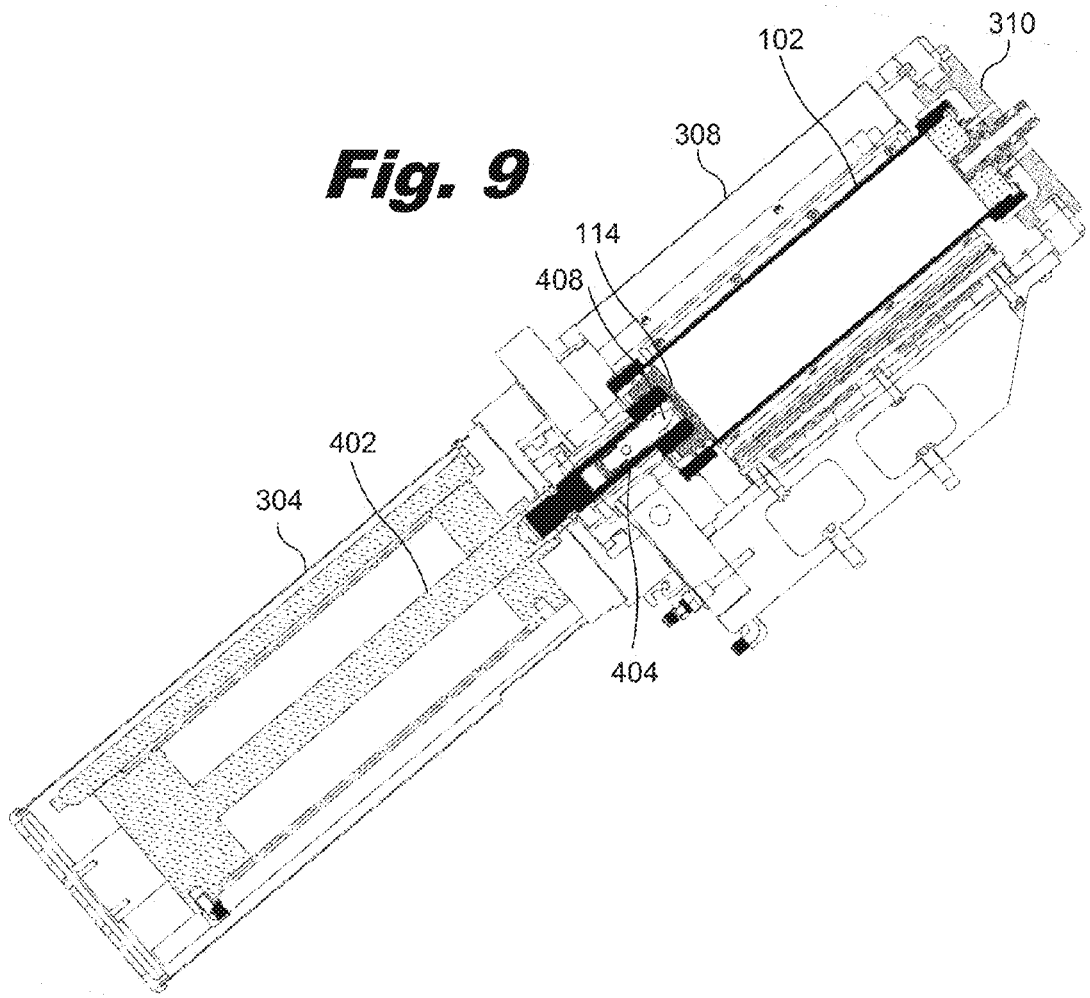
Fig. 9

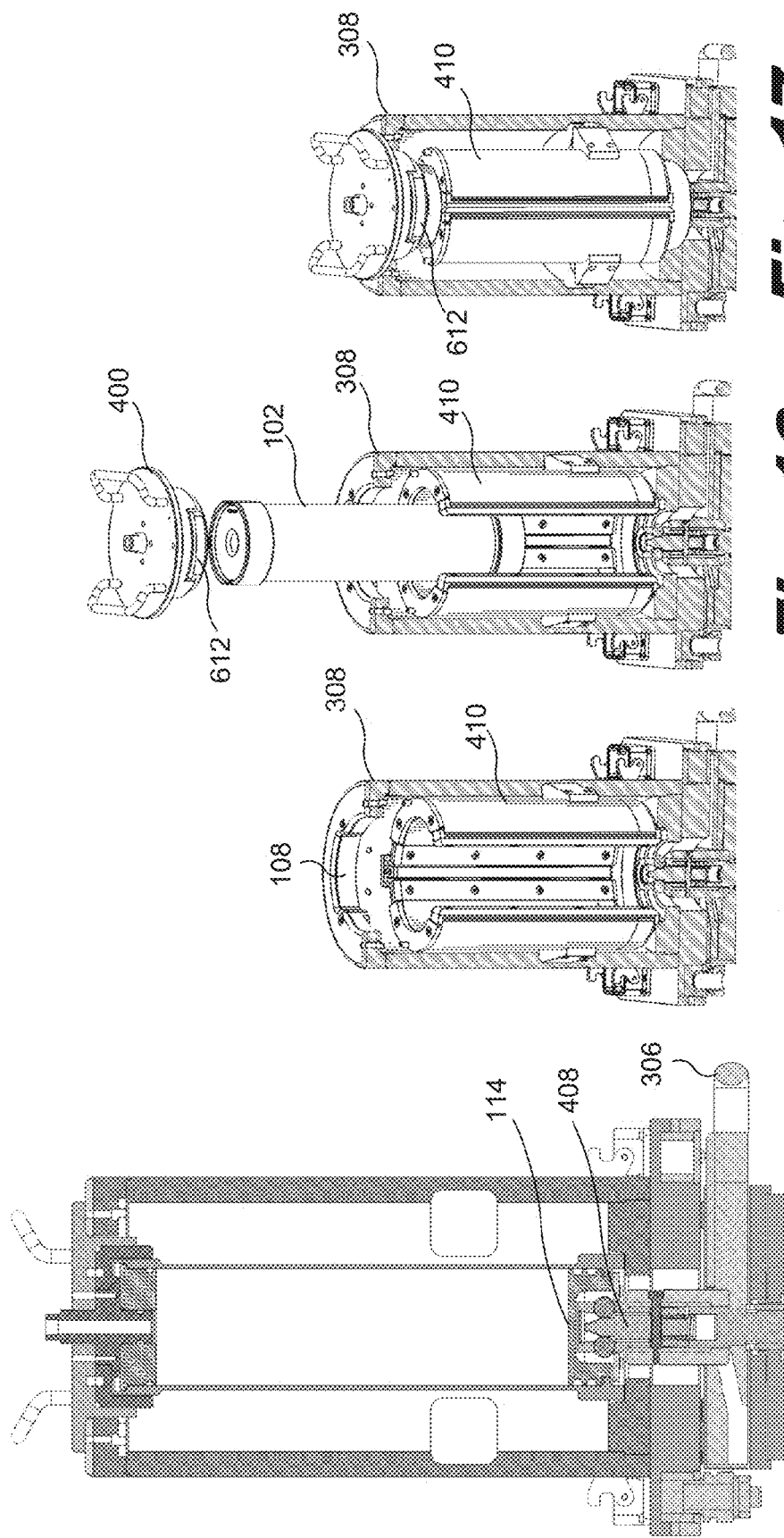

REUSABLE CARTRIDGE FOR INJECTION MOLDING

CROSS-REFERENCE TO RELATED APPLICATIONS

Priority is claimed from U.S. Provisional Patent Application 61/598,295, filed Feb. 13, 2012, which is hereby incorporated by reference

BACKGROUND

The following relates to the fabrication of composite structures using resin transfer molding (RTM) in areas such as high-tech composite structure fabrication.

Composite structures are well known for their physical properties of high strength and light weight materials. With these qualities, composite materials are gaining wide use in a variety of structural and non-structural applications. RTM is one method of fabricating composite structures.

Current RTM technology produces lightweight parts with excellent mechanical properties. As the use of composite parts become more common in aerospace and aviation, a need arises for the RTM process to achieve higher production rates.

Any high rate production method must maintain the desirable qualities of RTM composite parts while decreasing the cycle time or "takt time" of the forming process. The resin injector system that includes resin filling, cleaning, and processing is one area to examine for improvements.

RTM Process Description

The Resin Transfer Molding (RTM) process is advantageous because it can consistently produce composite parts with high strength, complex geometries, tight dimensional tolerances, and part quality typically required of aerospace applications. In the RTM fabrication process, a structure made up of reinforcing material, known as a preform, is placed in a closed matched mold which is then tightly sealed. A high vacuum is typically applied to the mold before and during injection to improve part quality and resin flow throughout the mold. Resin is then injected into the mold under elevated pressure and temperature to impregnate the preform. The impregnated preform structure is then cured to produce the final molded product.

In RTM and most other composite manufacturing processes, the final part geometry and mechanical strength properties are determined simultaneously. Composite structure applications that require high strength and tight geometric tolerances must have a fabrication process that controls several critical parameters including preform creation, injection, and curing.

One element of the RTM process is the resin injection system that is required to inject thermosetting resin at an elevated temperature and pressure into the mold. To achieve this the injection system resin container must be capable of both displacing resin and sealing resin from leakage at typical process temperatures of 250° F. (~120° C.), injection pressures of 250 psi (~1.7 MPa), and vacuum greater than 1 torr (~100 Pa).

Positive Displacement Injectors

One of the most common methods of injecting resins for RTM fabrication is a positive displacement (PD) injection system. A PD injection system comprises a specialized cylinder into which resin is loaded. Located at the bottom of the cylinder is a movable piston. The piston is connected to an actuator which translates the piston up the cylinder displacing resin out and into the mold. The cylinder and piston assembly of a positive displacement injector is highly engineered to displace resin at elevated temperatures while under the high vacuums or high pressures required in the RTM process.

PD injection systems also allow for resin degassing processes to be conducted after the resin is loaded into the cylinder by sealing the cylinder and applying a vacuum. Positive displacement injectors provide precise control of resin pressure, flow rate, and temperature control critical to the RTM process. PD injections systems require the manual loading, degassing, and cleaning of resin which requires additional process time. While this is acceptable for low rate RTM production, typically 2-3 parts per day, the required injection processing time, manual operations, and operator exposure to resin and solvents may be unacceptable for higher production rates.

Pressure Pots

Another method of injecting resin for RTM molding involves the use of a pressure pot injection system. A pressure pot consists of a chamber which is filled with resin and tightly sealed. To inject resin, the chamber is pressurized with a compressed gas. This pressure forces resin into the inlet of a tube submerged in the resin and which exits at the mold. Pressure pots are capable of heating resin as well as sealing against vacuum for resin degassing operations.

Pressure pot injection system provide the pressure monitoring and control similar to PD injectors while typically being more compact and simple to operate. Pressure pots are typically disadvantaged when used to achieve the high strength and quality requirements in aerospace applications of RTM. This is due to a lack of accurate resin flow control critical to the RTM process. Pressure pots may also pose a high safety risk due to bursting of the chamber under the high (typically >250 psi (~1.7 Mpa)) injection pressure required. Pressure pots like PD injectors require the manual loading, unloading, degassing, and cleaning of resins which requires additional process time. This requires additional injection processing time, manual operations, and operator exposure to resin and solvents that do not support higher production rates.

Pail Unloading Injectors

A third method of RTM injection may be performed with pail unloaders.

Pail unloader injection systems are unique in that they are able to draw resin from the resin shipping container and inject directly into the RTM mold. A pail unloader accomplishes this by driving a heated punch into the resin shipping container. The punch heats the resin and displaces it into a geared pump. The pump then controls resin flow and pressure as it pumps resin to the mold.

Pail unloaders allow multiple injections to be performed from the single loading of a typical 5 gallon resin shipping container. The cleaning cycle is longer and more complex than PD or pressure pot injectors; however the cleaning is only performed once per pail loading, which aids in reducing the overall injection processing time.

Note that pail unloaders typically include a geared pump design that is particularly prone to large resin pressure and flow pulsations that are unacceptable in high performance RTM processing. Frequent cleaning is required to prevent the thermosetting resins from curing and to remove buildup inside the internal pump passageways. Such cleaning requires the use of large volumes of solvents for flushing the pump to clear resin from within the pump. The manual operations required, injection process fluctuations, and operator exposure to resin and solvents is unacceptable for higher production rates.

Various techniques may be used for RTM cleaning.

Pressure Pot Cleaning

One method of pressure pot cleaning is to scrape the remaining resin out of the pressure pot, then use solvent to clean the pot. A second method is to place a disposable liner in the pressure pot, then dispose of the liner after using the pressure pot. A third method is to place a resin container within the pressure pot. With this third method, the separate resin container is either cleaned or disposed.

Cleaning Positive Displacement Injectors

In positive displacement injectors, the injection cylinder and piston must be cleaned before another injection cycle can be conducted. The cylinder and piston are usually cleaned with solvent. The injector end cap is removed and the actuation rod pushes the piston all the way out of the cylinder. This action pushes the remaining resin out of the cylinder. The piston is removed from the actuation rod and the rod is retracted. The cylinder is wiped out with solvent and the piston is cleaned with solvent. Next, the actuation rod is extended so the piston can be attached. After reattaching the piston, it is drawn back into the cylinder. This method exposes workers to resin and solvent.

Cleaning Pail Unloaders

The heating punch is inserted into the top of the resin container to warm and pump the resin during injection. For cleaning, the heating punch is extracted from the resin container and placed in a similar container filled with solvent. The resin pump is activated. The pump draws solvent into the pump and circulates solvent through the pump and the resin injection lines. Solvent re-circulates for a period of time sufficient to clear the pump and lines of resin. The heating punch and wiper seal must also be cleaned with solvent. This method requires a significant amount of solvent.

The following comprise some limitations of current RTM methods.

Complex Time Consuming Operations

Current methods include complex operations for loading and unloading resin containers. Each individual process adds to the turn-around time or takt time of the injection process.

Time Consuming Cleaning Cycles

Frequent solvent-based cleanings are required to prevent buildup in pumps and containers.

Lack of Resin Degassing

Resin degassing capabilities are not available with some current methods.

Safety Problems—Exposing Workers to Resin and Solvent

Current methods expose workers to resin when handling resin containers, inserting tubing into resin containers and when cleaning containers. Cleaning procedures require the workers to use and dispose of solvents, which can be hazardous substances.

Process Variability

The heating and pumping systems employed in current methods cause variations in resin outlet pressure, flow rate, and resin temperature. These issues can affect the quality of parts produced.

SUMMARY

One aspect is directed to a cartridge apparatus comprising a barrel having an open proximal end and an open distal end, sealing means that seal the open proximal end of the barrel, piston means that change the effective volume of the barrel, and locking means for sealing the open distal end of the barrel and restricting distal longitudinal movement of the piston means relative to the barrel.

One aspect is directed to a cartridge apparatus comprising a barrel having an open proximal end and an open distal end, sealing means that seal the open proximal end of the barrel, piston means axially movable and longitudinally movable within the barrel, the longitudinal movement changing the effective volume of the barrel, locking means for sealing the open distal end of the barrel and restricting longitudinal movement of the piston relative to the barrel, actuating means for applying longitudinal pressure to the piston means, the actuating means comprising locking means to restrict axial movement of the piston means, housing means that has a proximal and distal end, the housing means circumferentially clamping the walls of the barrel and providing controlled heating means, mounting means for attaching the barrel to the actuating means and receiving the barrel in the housing means, the mounting means comprising a central opening for the actuation means to engage the piston means, cap locking means that cause the housing means to clamp around the barrel and engage the proximal end with a quick connect sealing device, the cap locking means engaging the proximal end of the housing means to cover the barrel at its proximal end and providing an opening whereby resin can exit the barrel and be injected into a mold.

BRIEF DESCRIPTION OF THE DRAWINGS

FIG. 1 is an exploded perspective view of the cartridge.

FIG. 2 is a longitudinal cross-sectional view of the cartridge.

FIG. 3 is a frontal view of the proximal end of the cartridge.

FIG. 4 is a perspective view of the cartridge that includes the distal end of the cartridge with the locking plate in an open position.

FIG. 5 is a perspective view of the cartridge that includes the distal end of the cartridge with the locking plate in a locked position.

FIG. 6 is a perspective view of the cartridge carrier cap.

FIG. 7 is a perspective view of the receiving end of the cartridge carrier cap.

FIG. 9 is a cross-sectional view of the actuator, injector housing, and cartridge.

FIG. 10 is a perspective view of the actuation rod.

FIG. 11 is an exploded view of the actuation rod and the locking plate.

FIG. 14 is a cross-sectional view of part of the injector assembly.

FIG. 15 is a view of the cartridge housing.

FIG. 16 is an exploded view of the cartridge housing, cartridge, and carrier cap.

FIG. 17 is a view of the cartridge inside the cartridge housing and sealed by the carrier cap.

DETAILED DESCRIPTION

Cartridge

Figure 8:
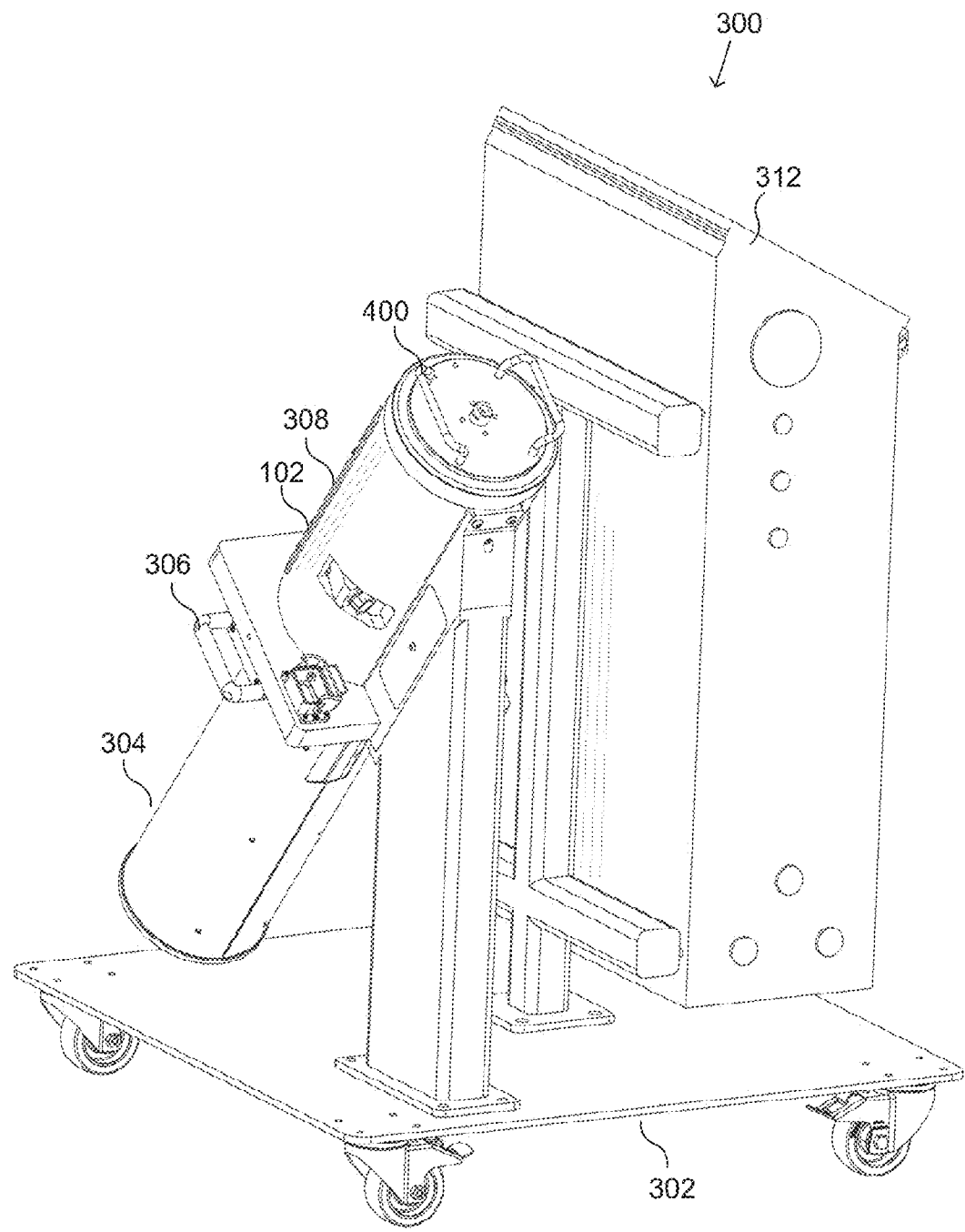
FIG. 8 is a perspective view of the injector assembly.

In reference to FIGS. 1 and 2, a cartridge apparatus 102 is shown comprising a distal coupling member 106, a proximal coupling member 104, a piston 114, and a locking plate 118.

The cartridge 102 may be barrel, tubular, and generally cylindrical in form, such that it is fashioned to receive resin in a repeatable manner. Also, the cartridge 102 may be manufactured out of hard black-anodized aluminum for high heat transfer and added durability, although other suitable materials with similar and different properties may be used according to desire. Furthermore, the walls of the cartridge 102 and its features may be configured to withstand high pressure as well as high vacuum.

Features that may be present on the cartridge 102 include an inner shoulder 110 near the proximal end of the cartridge 102 and a stop tab 112 near the distal end of the cartridge 102. The first feature, the inner shoulder 110, may appear as the result of two bore sections within the cartridge 102. The bore section near the proximal end of the cartridge 102 has a larger diameter than the bore section of the central body of the cartridge 102. The shoulder may also be in the form of a ridge that is molded from the inner cartridge 102 walls or attached to the inner cartridge 102 walls. Of course, the shoulder 110 may be configured in a variety of other ways.

The second feature on the cartridge 102, the stop tab 112, may comprise a flange that extends radially inward, and perpendicular to the longitudinal axis of the cartridge. An additional stop tab 113 may also be present. In the embodiment shown, stop tabs 112 and 113 are configured so as to be diametrically opposed. Additional stop tabs may also be used. Embodiments may use self-activating release locks or other types of stopping means.

Both the inner shoulder 110 and the stop tab 112 serves in sealing the cartridge 102, and are described in more detail below.

On the ends of the cartridge 102 may be found coupling members 104 and 106. Coupling members 104 and 106 may be formed as flanges on the cartridge. Alternatively, they may be attached or bonded to the cartridge 102. They may comprise the same material as the cartridge 102, such as hard black-anodized aluminum. They may also comprise a variation of aluminum, or they may comprise a different material altogether. Moreover, one coupling member may differ in material composition from the other coupling member.

In embodiments, the proximal coupling member 104 comprises a cartridge alignment face 108 on the outer surface of the proximal coupling member 104, such that it provides use in orienting the cartridge 102. Also, it may provide use in controlling rotational movement of the cartridge 102, and more specifically, rotation around the longitudinal axis formed between the proximal and distal ends of the cartridge 102. The cartridge alignment face 108 is depicted as a flat smooth surface in FIG. 1; however, the surface may comprise ridges, roughness, and uneven finishing.

Additional control may be provided with a second cartridge alignment face 109 on the outer surface of the proximal coupling member 104. For example, a second cartridge alignment face 109 is depicted in FIG. 3 in a diametrically opposed position relative to cartridge alignment face 108. It is conceived that still more cartridge alignment faces may be provided on the proximal coupling member 104 as desired.

Note that the cartridge alignment faces 108 and 109 may appear in all the same variations with respect to distal coupling member 106. Such cartridge alignment faces provide added control in handling and transporting the cartridge 102. They also may be used for alignment and confinement purposes.

Also shown in FIGS. 1 and 2 is an end plug 124 that may be used to seal the proximal end of the cartridge 102. Alternatively, the end plug 124 may seal the distal end of the cartridge. Moreover, two end plugs may be used to seal both ends of the cartridge 102.

The end plug 124 may comprise an outlet 126, annular grooves 128, an annular lip 130, and a small cap 125. First, the outlet 126 provides an opening to receive a resin connect, or quick connect 610, for coupling the cartridge 102 to an injector cap 606 and/or resin injection line to transfer cartridge contents to an RTM mold 614. The opening also allows for the release of resin or pressurized contents that may build up in the cartridge 102 during a warming cycle. This is also a safety feature for relieving pressure during storage, transportation, preheat cycles, or loading processes prior to the cartridge 102 being sealed for injection purposes. This opening is also designed for easy and quick cleaning. An additional use of outlet 126 is to receive a quick connect, or some type of nozzle, for use in cleaning and pressure testing cartridge 102. Additional uses are further anticipated.

Secondly, the end plug 124 may comprise annular grooves to be fitted with a sealing ring, such as an O-ring seal. This enables a friction fit when the end plug 124 is inserted into the open end of the cartridge 102 and provides a seal against pressure, vacuum, and the contents. In other words, the O-ring seal serves to hold the retainer in a tight fit, or tight seal, within the cartridge. Other means of configuring the end plug 124 may be used to ensure that a tight fit is achieved. Also, means other than an end plug 124 may be used to create a desired secure sealing of the cartridge 102.

Although the end plug 124 uses a friction fit, other types of fit could be used such that the end plug is conical, or tapered, at its distal end. Securing methods, such as threads, locking pins, or machined locking features could provide a sealing for the cartridge 102.

Third, the end plug 124 may comprise an annular lip 130 that extends radially outward. The end plug 124 is slidably received within the cartridge 102 until the annular lip 130 is stopped by the inner shoulder 110. Depending on the position of the inner shoulder 110 within the cartridge 124, the end plug 124 may rest completely inside the cartridge 102 or may have some exposure outside of the cartridge 102. Alternatively, the annular lip may extend farther than the outer diameter of the proximal coupling member 104. In this case, the annular lip 130 may rest against or be stopped by the proximal end of the proximal coupling member 104. Thus, an inner shoulder 110 may not be included in embodiments.

Embodiments may further include a small cap 125. For example, the small cap 125 may seal an opening in the end plug 124 after resin is introduced into the cartridge 102 while under a vacuum state. This seals and protects the cartridge 102 and the resin against contaminates. When the cartridge 102 is placed in a warming oven, but prior to placing the cartridge into the injector, the small cap 125 can then be removed. The small cap 125 may include a sealing ring, such as an O-ring, to provide a friction fit within the opening of the end plug 124.

On the distal end of the cartridge 102, a piston 114 may be positioned within the walls of the cartridge 102. To position the piston 114 at the distal end, the piston 114 may be slidably inserted through the proximal opening of the cartridge 102 and then lowered to the distal end, stopped by stop tabs 112 and 113. In this manner, the piston 114 is prevented from sliding out or being pushed out through the distal end of the cartridge 102. Embodiments include other means of preventing movement of piston 114, such as ridges, smaller diameter sizes within the cartridge 102, and other means that are known with the art. Alternatively, there may be nothing to prevent the piston from being removably inserted through the distal end. Embodiments include that stopping means be attached or otherwise engaged once the piston is received into the cartridge 102.

The piston 114 may be configured to seal the distal end of the cartridge 102. Also, the piston 114 may have annular grooves 116 to retain one or more O-ring seals. The O-ring seals provide a tight seal, or tight fit, between the piston 114 and the inner walls of the cartridge 102. Although the piston is tightly retained within the inner walls, the piston 114 may rotate axially within the cartridge 102. The inner walls may have a smooth surface finish with a specific bore to piston OD diametral clearance to withstand certain temperatures and pressures. For example, a diameter clearance of approximately 0.010 inch may support high operating temperatures and pressures.

Figure 24:
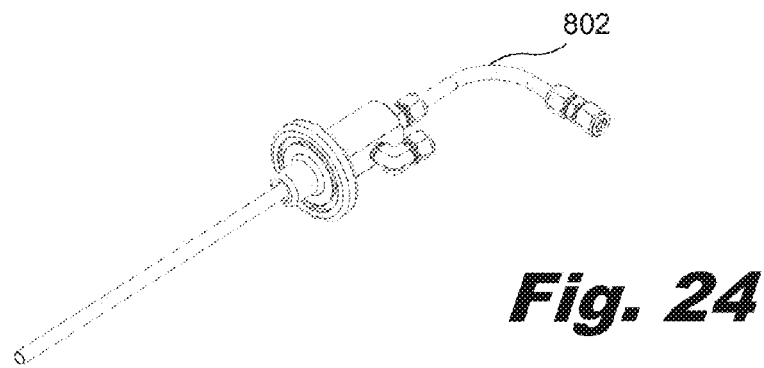
FIG. 24 is a perspective view of a resin fill attachment.

An order of assembling the cartridge 102 may comprise the following steps: first, inserting the piston 114 within the cartridge 102; second, rotating the piston to a locked position; and third, inserting the end plug 124, then filling the cartridge 102 with resin that is to be injected. The resin may be injected through means such as a resin fill attachment that includes a small tube and that may be inserted through outlet 126 with the end plug 124 in place. An exemplary resin fill attachment 802 is shown in FIG. 24.

Also, the stop tabs 112 and 113 may be removable or actuated such that the piston 114 may be inserted from the distal end of the cartridge 102.

The locking plate 118 may remain attached to the piston 114. Alternatively, it may be removed and reattached. Pushing the piston 114 out of the proximal end may be part of the cleaning process. The o-rings wipe the cylinder clean while they push residual resin out of the cylinder, or cartridge 102, and into a cleaning fixture. Alternatively, the cartridge 102 may be constructed with a fixed end having an opening similar to plug outlet 126. Thus, the piston 114 may be inserted through the distal end and then secured to the cartridge 102 with a locking configuration. Means for locking can be similar to the locking plate 118 or have various other configurations.

Locking Plate

Locking means may comprise a locking plate 118 that may be affixed at the distal end of the barrel, to the distal surface of the piston 114. Another ordering of assembly may also be possible. In FIGS. 1 and 2, a locking plate 118 is shown affixed to the piston 124. Although the locking plate 118 is shown with screws 118a-d, for affixing the locking plate 118, other attachment means may be used. For example, the locking plate 118 may be bonded to the piston 124 with an adhesive layer, or integrally machined. The piston 114 may be molded from a plastic, such as ultra high molecular weight (UHMW) polyethylene, with a locking plate-like feature integrally molded. This distinction may require a different actuator end design.

The locking plate 118 provides a key opening 122 for the insertion of members that may actuate the piston 114. Also, the locking plate 118 provides a locking plate tab 120 that may be used in conjunction with the stop tab 112 of the cartridge 102 to prevent, or restrict, longitudinal displacement, or movement, of the piston 114 relative to the cartridge 102. As shown, a second locking plate tab 121 is placed diametrically opposed from locking plate tab 120 and may be used in conjunction with stop tab 113 to prevent displacement. As shown, displacement of the piston 114 toward the proximal end is halted when locking plate tabs 120 and 121 contact the cartridge stop tabs 112 and 113.

Turning to FIGS. 4 and 5, distal end views of the cartridge 102 with the locking plate 118 affixed to the piston 114 are shown. FIG. 4 depicts the locking plate 118 in an open position, with locking plate tabs 120 and 121 not in contact with stop tabs 112 and 113. FIG. 5, on the other hand, depicts a closed position of the locking plate 118 after rotating the plate tabs 120 and 121 with respect to the cartridge axis 102 such that plate tabs 120 and 121 contact stop tabs 112 and 113. In the closed position, stop tabs 112 and 113 restrict the piston 114 from moving longitudinally within the cartridge. Further rotation of the piston and locking plate 118 shifts the locking plate 118 from stop tabs 112 and 113, once again allowing the piston 114 to be displaced longitudinally inside the cartridge 102.

Carrier Cap

Turning to FIGS. 6 and 7, perspective views of a carrier cap 200 are shown. The carrier cap 200 facilitates means of handling the cartridge 102, which is particularly helpful when the cartridge 102 is hot. The carrier cap maintains a seal over the outlet 126 in the end plug 124, which serves to avoid spilling hot resin if the cartridge 102 is tipped or dropped. The carrier cap 200 may be locked onto the cartridge 102 to maintain a seal over the cartridge 102 and end plug 124.

As the carrier cap 200 is placed on the cartridge 102, alignment faces in the carrier cap 200 align with coupling alignment faces 108 and 109 on the cartridge 102 to retain the cartridge 102 in position. With the locking handle 204 in the unlocked position 212, the axial rotating sleeve 216 aligns with the coupling alignment faces 108 and 109 at the proximal end of cartridge 102. The carrier cap 200 includes carrier cap alignment faces 218 and 219 that may be aligned with the cartridge alignment faces 108 and 109.

Embodiments also include using the carrier cap 200 with the cartridge 102, but without the end plug 124. The carrier cap 200 may be designed to include features of the end plug 124. The carrier cap 102 may include an inner gasket 220. Such inner gasket 220 may include annular grooves that are fitted with O-ring seals and which are seated within the cartridge 102 to achieve a tight, friction fit.

In lifting, handling, and carrying the cartridge 102, carrier handles 208 and 209 are included with the carrier cap 200. Alternatively, there may be only one handle or multiple handles provided. The carrier handles 208 and 209 are useful because they provide a safe means for carrying the cartridge 102, not only because the cartridge 102 may be heavy with resin or other materials, but also because the cartridge 102 may be at high or low temperatures.

A lock lever 204 included in the cartridge carrier cap 200 comprises a handle that can be put in at least two positions. The lock lever 204 may take the form of a handle that extends radially outward from the carrier cap 200 through a slot 205, and which rotates in a plane perpendicular to the central axis of the carrier cap 200, as shown in FIGS. 6 and 7. At one end of the slot 205, the lock lever 204 may be positioned such that the carrier cap 200 is locked to the cartridge 102. At this position, the lock lever 204 may be held fixed, for example, with a lock release pin K 206, which comprises a pin that prevents the lock lever 204 from being rotated which could allow the carrier cap 200 to unintentionally open. There are many other ways to design a means to hold the lock lever 204 in place, including, but not limited to, pins, keys, cams, and actuators. Means may be used that provide a simple and safe method of removably maintaining the lock lever's 204 position.

At the other end of the slot 205 is a position that releases the carrier cap 200 from the cartridge 102. Again, the lock lever 204 may be held fixed, this time at the unlocked position with, for example, a lock release pink K. The aforementioned means of retaining the lock lever 204 in place may be used. Disengaging the lock lever 204 from either the locked position or the unlocked position may be accomplished by pulling out lock pin K 206 and rotating the lock lever 204 around the axis and in the direction of the other position.

Lock release pin K 206 may be spring loaded to engage a hole in an internal plate attached to lock lever 204. Lock release pin K 206 engages a hole at the lock position and at the unlock position to retain lock lever 204 in position. To change from lock position to unlock position, the lock pin may be pulled up while rotating locking handle 204. To disengage the lock release pin K, the lock release pin K 206 may be pulled upward. Spring pressure causes lock release pin K 206 to engage a retaining hole when lever 204 is placed at either the lock or unlock position. Embodiments may include other locking means for restricting movement of the lock lever 204.

As the lock lever 204 moves toward a locked position, it causes the sleeve 216 to rotate, which causes cap locking tabs 214 and 215 to engage the proximal coupling member 104 of the cartridge 102 at the coupling alignment faces 108 and 109. Note that multiple tabs along the inner wall may be used to lock the carrier cap 200. Thus, in a small number of steps and in a relatively quick period of time, the cartridge 102 may be locked securely to the carrier cap 200.

Also, the carrier cap 200 is useful for removing cartridges from an oven and placing them into an injector system, although other uses may be helpful as well. For freezing the cartridge 102, the end plug 125 or another temporary cap may be used to provide sealing means to protect the resin from contamination and moisture.

Degassing may be performed on the resin prior to placing it into the cartridge 102. Alternatively, a degassing cycle may be performed on a cartridge 102 after it is filled with resin. The production process may run more efficiently if degassing is performed as a batch process before filling the cartridges 102. Degassing may be performed after warming the cartridge 102, but that may not be the optimal timing because at that point in the process, time is of the essence and the injection process should proceed.

When the carrier cap 200 is locked onto the cartridge 102, the O-ring seal on the end plug 124 is pressed tightly between the end plug 124 and the inner shoulder 110 of the cartridge 102, effectively sealing the cartridge 102.

Note that the carrier cap 200 presses on the end plug 124, but may not necessarily seal the end plug 124 to the cartridge 102. The end plug 124 is held in position in the cartridge 102 by the friction of the end plug 124 and sealing o-ring. The tight fit of the carrier cap 200 to the cartridge 102 helps to ensure a tight grip on the cartridge 102 and prevent the cartridge 102 from moving around relative to the carrier cap 200, possibly damaging it.

Injector System

When filled with resin and warmed, the cartridge 102 may be transferred to become part of an injector system 300. Embodiments also include that the resin be warmed in the injector system 300. Referring to FIG. 8, the injector system 300 comprises a movable base 302, a control console 312, an actuator 304, a piston lock handle 306, an injector housing 308, the cartridge 102, and an injector cap 400.

The movable base 302 enables the injector system 300 to be contained as a single compact unit. As part of the movable base 302, a platform 303 provides a place on which the other members of the system may rest, be mounted, or be otherwise secured. To make it more movable, the platform 303 may also be wheeled. Such mobility provides the system 300 with access to many different locations, including locations that may otherwise be difficult to reach.

Located on the movable base 302 is the control console 312, which comprises system controls. Alternatively, controls may be provided through a remote computer station or other location not mounted to the movable base 302. The control console 312 may display parameters for actuator pressure, heater temperature and resin flow rate. The control console 312 may also provide several operator interface controls to change parameter settings. A permanent mounting for the injector system, such as a press, may also serve as the base.

On top of the movable base can be found the injection members, comprising an actuator 304, a rod end 408, the piston 114, the cartridge 102, an injector housing 308, and an injector cap 400, as shown in FIG. 9.

The actuator 304, or linear motion instrument, is used to drive the piston 114. Specific types of actuators that may be used include screw jacks, ball screws, roller screws, air cylinders, hydraulics, and rack and pinions. The actuator 304, as shown, comprises an air cylinder 402, an actuation rod 404, and a piston lock actuation mechanism 406.

Referring to FIGS. 10 and 11, the actuation rod 404 includes a rod end 408 configured to align with key opening 122 of the locking plate 118. The actuation rod 404 may further include a release lock 504 and a quick latch lever 506

Piston 114 is typically in the locked position when inserted into the injector. As the cartridge 102 is inserted into the injector, key opening 122 aligns with the flat sides of rod end 408 and locking plate 118 moves past unlocked release lock 504. With the locking plate below the release lock 504 and locking plate and locking plate 118 in the closed position, the piston 114 may be locked to the end of the actuator 304. Location faces 108 and 109 on the proximal end of 102 align with locking tabs 112 and 113 on the distal end. This enables the user to orient the cartridge 102 by a simple observation of alignment faces 108 and 109 on the proximal end of the cartridge 102 rather than view the distal region of the cartridge 102.

Knowing the orientation of the key opening 122, the user places the cartridge 102 on the actuation rod end 408 such that the actuation rod end 408 aligns with the key opening 122. Once fully aligned, the actuation rod end 408 is situated or fitted into the key opening 122. Thus, rotational restriction of the actuator rod end 408 restricts the piston 114 from axially rotation.

When the actuation rod end 408 is properly inserted into the key opening 122, the release lock 504 may be activated, or caused to actuate, by the quick latch lever 506. The quick latch lever 506 can be a type of release structure, such as a ball lock, that extends radially outward to engage the inner walls of the lock plate 118. The quick latch 506 may comprise other configurations also.

For assembly purposes, the cartridge 102 may be first inserted within the cartridge housing 308. Then, the quick latch lever 506 may be actuated to lock the piston 114 onto the actuator. Following the piston being locked, the cartridge 102 may be rotated after the injector cap 400 is installed.

During cleaning, the locking plate 118 may remain attached to the piston 114.

Properly aligned, the rod end 408 extends into the cartridge 102 when the actuator 304 is pressurized from the air cylinder 402, displacing the piston 114 longitudinally within the cartridge 102.

Containing the cartridge 102, the injector housing 308 is used in conjunction with the actuator 304. Such injector housing 308 may be fastened, connected, or secured to the actuator 304. Although the injector housing 308 contains the cartridge 102, it also serves as a structural member to react to the forces imparted on the cartridge during pressurization. Also note that the cartridge 102 and the injector housing 308 are designed not only to withstand high pressures and a vacuum in general, but also high temperatures.

FIG. 14 depicts a piston lock 306 positioned at the junction between the injector housing 308 and actuator 304. The piston lock 306 may comprise an actuator which locks and unlocks a latch on the actuation rod 404 (rod end 408). When a cartridge 102 is inserted into the injector housing 308, the piston lock 306 may be used to lock the actuation rod end 408 to the piston 114, and thus the cartridge 102.

The injector housing 308 may include two heater sleeves 410 and 411 that form a cylindrical insulating cuff around the cartridge 102. With one side of the heater sleeve 410 hinged to one side of the other heater sleeve 411, the two heater sleeves 410 and 411 are hinged together such that they can open and close. Heater sleeves 410 and 411 may be rounded and curved to form a cylinder or some other figure when closed. When open, heater sleeves 410 and 411 may receive the cartridge 102. When closed, heater sleeves 410 and 411 tightly surround and cuff the walls of the cartridge 102.

The heater sleeves 410 and 411 may provide heat to the cartridge 102 by using the control console 312. Such heating may be performed with electric or fluid exchange heaters. Accordingly, the temperature of the cartridge 102 and its contents may be monitored and changed as needed. Alternatively, temperature and heat exchange may be automated. Also, the heat sleeves 410 and 411 may provide no heat. Regardless of whether or not heat is emitted, the heater sleeves 410 and 411 may be configured to provide insulation to maintain the cartridge at its elevated temperature.

For purposes that include supporting the cartridge 102 as it is inserted into the injector housing 308, embodiments of the injector housing 308 may include wear strips 414. For example, Teflon strips may coat or serve as a lining on the inner walls of the injector housing 308. Wear strips 414 may also be mounted at the mating sides of the heater sleeves 410 and 411, or in other words, the sides that come into contact when the heater sleeves 410 and 411 close together.

As part of the initial setup of the injection system, the carrier cap 200 may be used to carry cartridge 102 to the injector housing 308 and insert the cartridge 102 into the proximal end of the open injector housing 308. As cartridge 102 is inserted, notches 132 and 133 and coupling alignment faces 108 and 109 may be used to align the key opening 114 with actuation rod end for proper positioning of the cartridge. The piston lock 306 may then be used to lock the actuation rod 404 and rod end 408 to piston lock plate 118 and thus the cartridge 102. The carrier cap 200 may then be removed by disengaging the lock pin K and rotating lock lever 204 from the locked position and then removing the carrier cap 200 from the cartridge 102. Then, the injector cap 400 may be placed over the proximal end of the injector housing 308 and the cartridge 102, the cartridge 102 now locked within the injector housing 308. Alignment faces 606 and 607 inside injector cap 400 may be used to match up with cartridge alignment faces 108 and 109 to ensure proper alignment of cap 310 and cartridge 102. The injector housing 308 includes injector cap locking tabs 612 and 613 which lock the injector cap 400 to the injector housing 308.

Injector Cap

Figure 13:
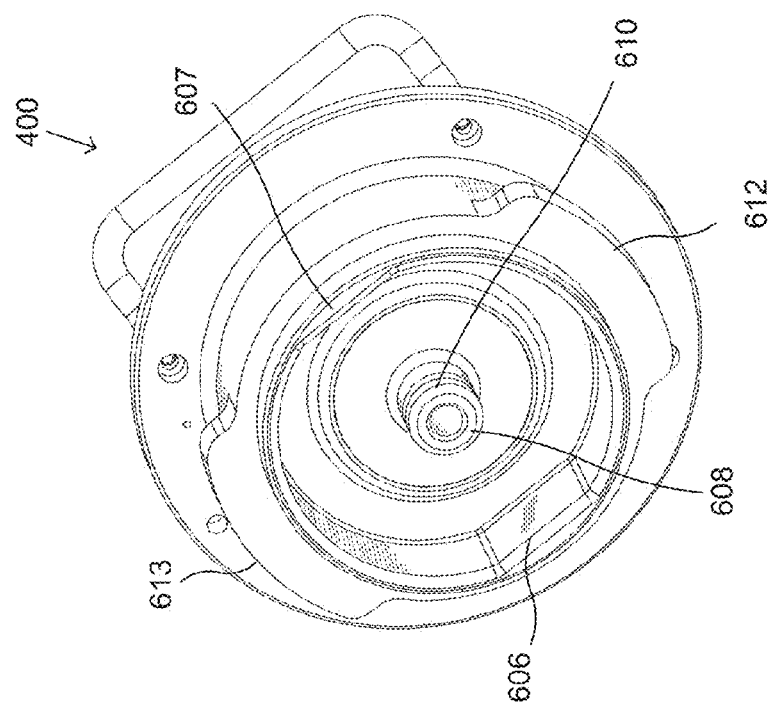
FIG. 13 is a perspective view of the receiving end of the injector cap.
Figure 12:
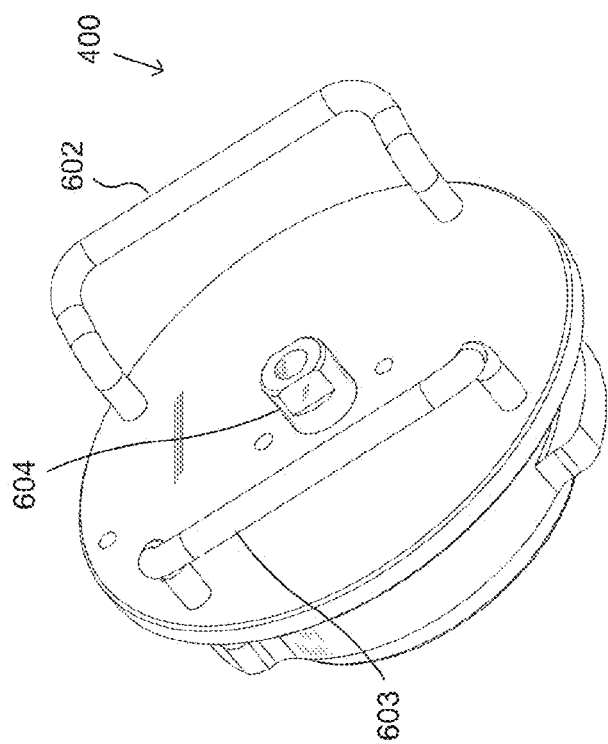
FIG. 12 is a perspective view of the injector cap.

Referring to FIGS. 12 and 13, the injector cap 400 is shown in two perspective views, the injector cap 400 comprising an injection line fitting 604, a quick connect 608, annular grooves 610, injector cap locking tabs 612 and 613, cartridge alignment faces 606 and 607, and injector cap handles 602 and 603. Injector cap 400 may close and seal the proximal opening of the injector housing 308 and lock the cartridge 102 in place.

In FIG. 14, a cross sectional view of the cartridge 102 in the injector housing 308 is shown.

FIGS. 15-17 show the injector housing 308 with sleeves 410 in an open position, an exploded view of the injector cap 400 and cartridge 102 in alignment with the injector housing 410, and the injector cap 400 locked to the cartridge 102 with the injector housing 410 in a closed position, respectively.

As an overview, the process of securing the injector cap 400 to the cartridge 102 and injector housing 410 is advantageous because it combines multiple steps in one. In a simple axial twist of a properly aligned injector cap 400, the axial twist causes the injector cap 400 to be locked to the injector housing 410 and thus secure the cartridge 102; the axial twist causes the heater sleeves 410 and 411 to form a cylindrical closure around the cartridge 102; and finally, the axial twist causes the cartridge 102 to axially rotate, thus causing stop tabs 112 and 113 to rotate away from the locking plate tabs 120 and 121, thus allowing longitudinal displacement of the piston 114 within the cartridge 102. Rod end 408 restricts piston 114 from rotation so locking tabs 120 and 121 remain stationary as tabs 112 and 113 rotate with the rotation of the cartridge 102. Such a feature allows efficient, fast and easy movements that avoid exposure to harsh chemicals and dangerous acts.

Figure 23:
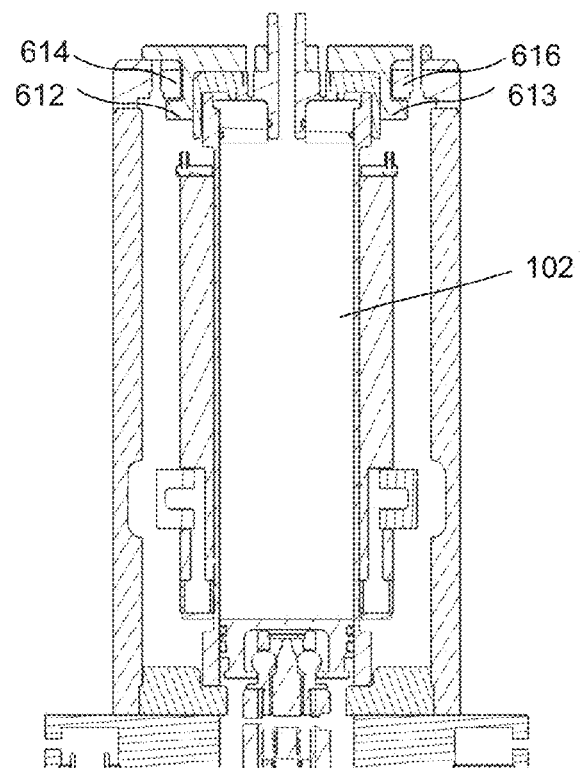
FIG. 23 is a perspective view of a cartridge disassembly tool.

To properly secure the injector cap 400 and cartridge 102 to the injector housing 410, the injector cap 400 may be properly aligned with the cartridge 102 and the injector housing 410. To properly place the injector cap 400 on the cartridge 102, the injector cap 400 may be placed on the cartridge 102, with diametrically opposed injector cap alignment faces 606 and 607 (see FIG. 13) aligned with cartridge alignment faces 108 and 109 (see FIG. 5). To properly place the injector cap 400 on the injector housing 410, the injector cap locking tabs 612 and 613 may be aligned with the injector housing tab receivers 614 and 616 (see FIG. 23).

Figure 22:
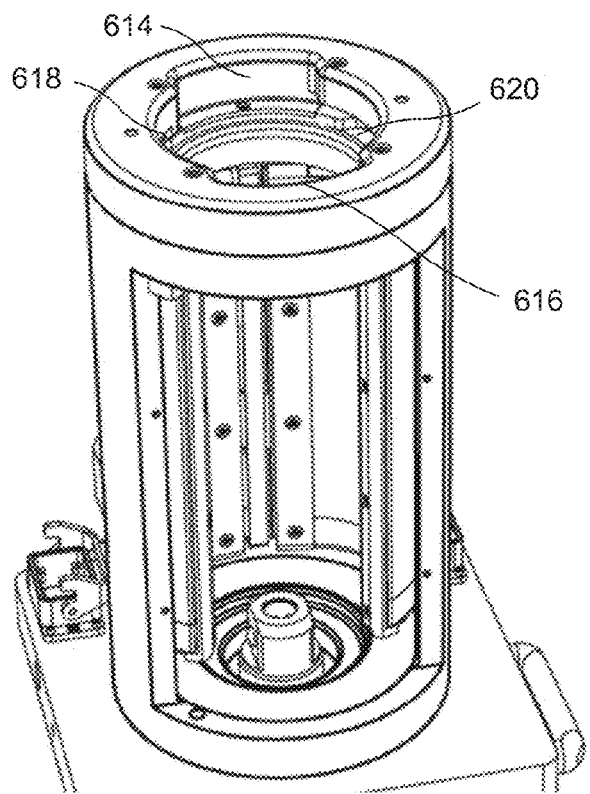
FIG. 22 is perspective view of a cartridge housing.

After the injector cap 400 is properly aligned with the cartridge 102 and the injector housing 410, the injector cap 400 may be secured to the injector housing 308 by a simple axial rotation of the injector cap 400. As the injector cap 308 is axially rotated, injector cap locking tabs 612 and 613 (see FIG. 13) of the injector cap 400 move away from the housing tab receivers 614 and 616 to slidably engage with the injector housing locking tabs 618 and 620 (see FIGS. 22 and 23). The housing locking tabs 618 and 620 prevent the injector cap locking tabs 612 and 613 from being removed and thus secure the injector cap 400 to the injector housing. This also effectively secures the cartridge 102 within the injector housing.

The process of aligning the injector housing 308 and the injector cap 400 with the cartridge 102 may be discerned from FIG. 16. As stated above, these acts of alignment and axial twist are beneficial because they provide for a fast, easy, and efficient securement of the injector cap 400 to the injector housing.

Moreover, closure of the injector housing may also be accomplished as the injector cap 400 is being axially rotated to secure the injector cap 400 to the injector housing. Thus, in an efficient and relatively easy manner, the injector cap may be secured to the injector housing and the injector housing closed in one axially rotational movement.

Note that the injector cap 400 holds the cartridge end plug 124 in place and contains the pressure during injection.

Turning to the distal end of the cartridge 102, another fast and efficient locking feature may be seen by the axially rotational movement described above. When the injector cap 308 is aligned with the cartridge 102, rotation of the injector cap 400 causes a similar rotation of the cartridge 102. As the cartridge 102 rotates, the key opening 122 of the locking plate 118 aligns with the rod end 408 of the actuation rod 404. Because the actuation rod 404 is not free to rotate axially, the aligned actuation rod 404 restricts the piston 114 from axial rotation. Embodiments may include variable rotational freedom.

Also, aligned rotation of the cartridge 102 and the injector cap 308 causes the locking plate tabs 120 and 121 to rotate away from stop tabs 112 and 113, thus allowing longitudinal displacement of the piston 114 within the cartridge 102. Rotation by the user may be accomplished by rotating the injector cap handles 602 and 603 when locking the cap 400 into the injector 308.

With the actuation rod end 408 fitted into the key opening 122, as the injector cap 400 rotates 90°, simultaneously rotating the cartridge 102, the locking plate 118 and piston 114 do not move because they are fixed to the actuator rod end 408. Therefore, the stop tabs 112 and 113 of the cartridge 102 rotate away from locking plate tabs 120 and 121. Rotating away from the stop tabs 112 and 113 unlocks the piston 114 so that it can be displaced longitudinally within the cartridge 102.

The quick connect 608 has annular grooves 610 on which an O-ring may be fitted. The quick connect 608 serves to seal the end plug opening with a resin transfer tube, the resin quick connect, and the injection line fitting. Also, the undersurface of the injector cap 308 may apply pressure to hold the end plug 124 in place. The end plug 124 applies pressure, effectively sealing the proximal end of the cartridge 102 in a tight and rigid manner.

The injection line fitting 604 provides an opening at the proximal end of the injector cap 308 which allows a resin injection tube to be connected, the resin injection tube carrying resin to a mold. The injection line fitting 604 may have a threaded tubing connection or annular grooves to hold O-rings that may seal the connection with a quick connect device.

Note that the injection line fitting and cartridge resin outlet could be positioned at or near the proximal end of the cartridge 102, and is not restricted to the end only.

Figure 19:
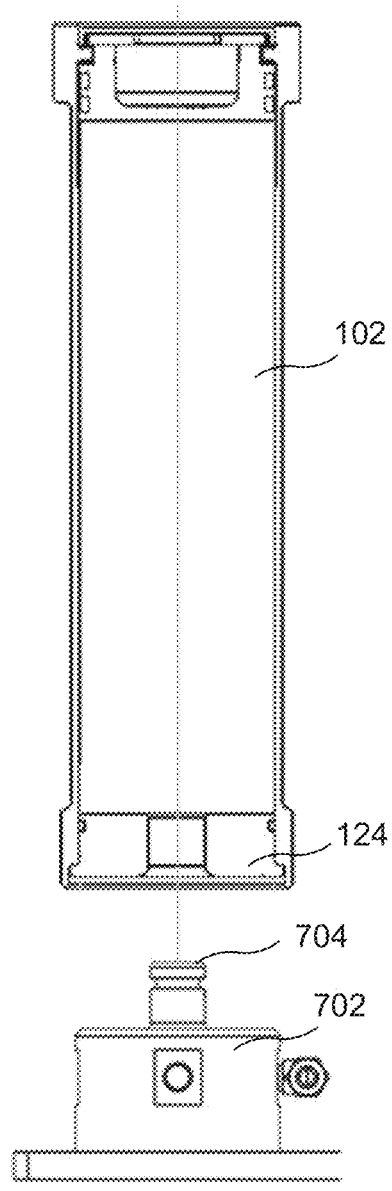
FIG. 19 is an exploded view of the cartridge and base.

Referring to FIG. 19, a cartridge 102, end plug 124, a vacuum test base 702, and vacuum insert 704 are shown in an unconnected state. The cartridge 102 may be connected to the leak station 702 forming a leak test station. For assembly purposes, the cartridge 102 may be initially put together following steps described previously. Such steps may includes installing the O-rings 220 (not shown) and the piston (not shown).

The piston may be locked by rotation of the cartridge relative to the piston, noting that the piston and cartridge features work together to facilitate the quick rotational movements for locking and unlocking. Steps may further include attaching the end plug 124. The cartridge 102 may then be placed onto the vacuum test base 702 with an opening of the end plug 124 allowing the vacuum insert 704 to be inserted. Modified steps or additional steps are also envisioned.

Note that the vacuum test base 702 has a quick connect feature. Thus, no tools may be necessary to attach the cartridge 102 to the vacuum stand 702. Quick connection is made possible by the vacuum insert 704 being the same type of O-ring quick connect as the end plug 124.

With the cartridge 102 attached, the cartridge 102 may be tested for leakage and other related properties. If the cartridge 102 passes the test, the cartridge 102 may be transferred to another station, such as the fill station.

Figure 20:
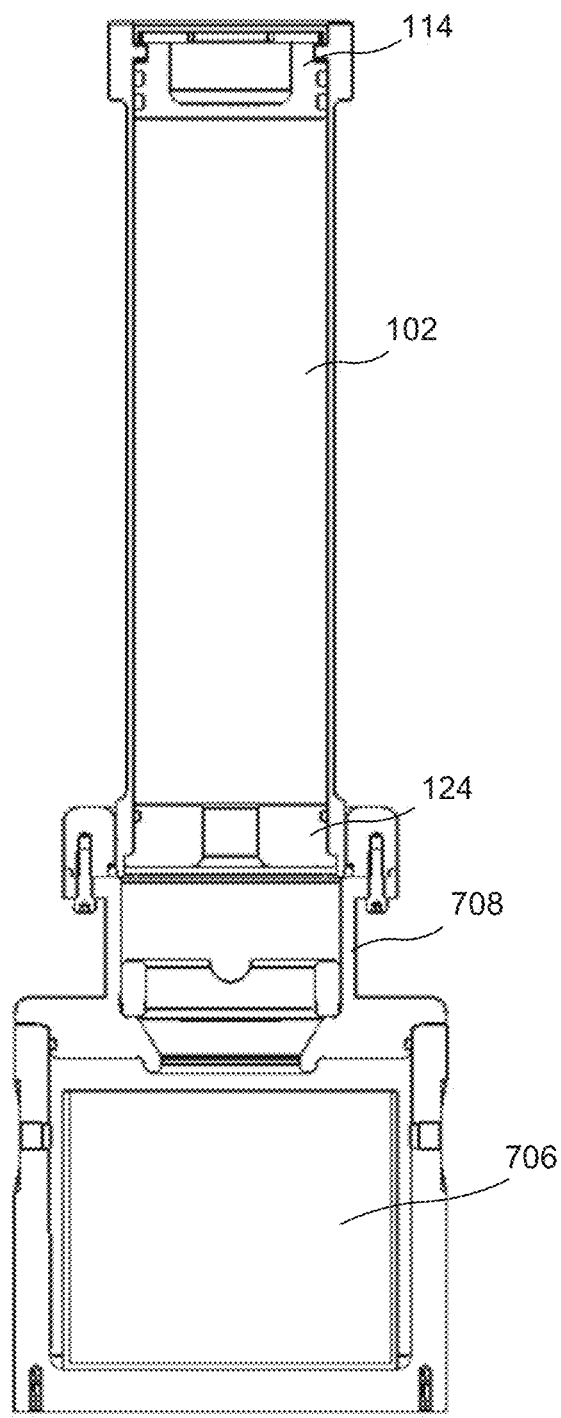
FIG. 20 is a view of the cartridge on the cartridge cleaning station before extracting the piston.

FIG. 20 shows the cleaning station which comprises the cartridge 102, a cleaning station base 706, and a cleaning cup 708. Here, the cartridge 102 may be placed on to the cleaning station base 706 with the end plug 124 engaging or otherwise connecting with the cleaning cup 708. This process may include inner side of alignment faces 108 and 109 being aligned with counter alignment faces on the cleaning cup 708 or other surface of the cleaning station base 706. After placement or connection, a vacuum is drawn on the cartridge 102 and cleaning cup 708. This process pulls the piston 114 within the cartridge 102 and towards the cleaning cup 708, which has the effect of wiping the inner cartridge surface clean. Note that both the piston 114 and the end plug 124 may drop into the proximal side of the cartridge 102 as a result of the process. The vacuum cleans the cartridge 102, the piston 114, and the end plug 124.

Note that unlocking and removing the piston 114 is quick and efficient because of the synergy created by the design features. With the design of the piston stop tabs 112 and 113 within the cartridge 102, the piston 114, piston locking plate 118, and locking plate tabs 120 and 121, quick unlocking and removal of the piston 114 (and injector cap 400) for an efficient cleaning process is achieved.

Figure 21:
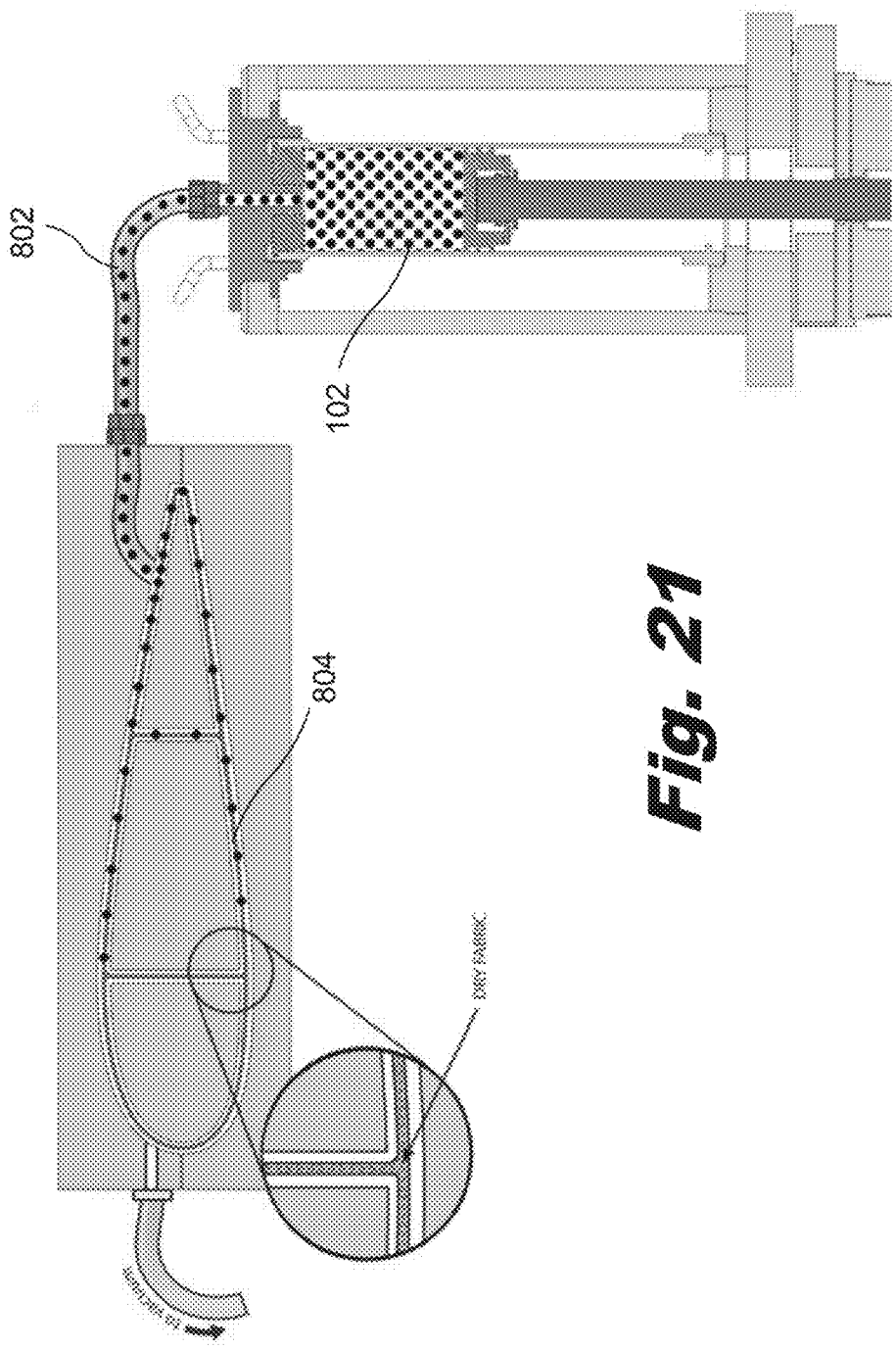
FIG. 21 illustrates the process of injection molding with a magnified view of the fabric being infused with resin.

FIG. 21 shows a visual that describes how resin is injected. Enlarged views show resin in a cartridge 102 being sucked by a vacuum through a resin fill attachment 802 and being infused into dry fabric 804 or other material. An enlargement of an enlarged view of the fabric shows how the resin is applied within the fabric 804 under high pressure.

FIG. 24 depicts a resin fill attachment 802. The resin fill attachment 802 may be inserted into the cartridge 102 as shown in FIG. 21. A vacuum may be drawn with a vacuum connection at the other end of the cartridge 102. Resin may be connected to the fill tube on the end shown with a curved neck. Resin is then pumped into the cartridge 102. Once the resin is pumped into the cartridge 102, the vacuum and the resin fill attachment may be removed.

Figure 25:
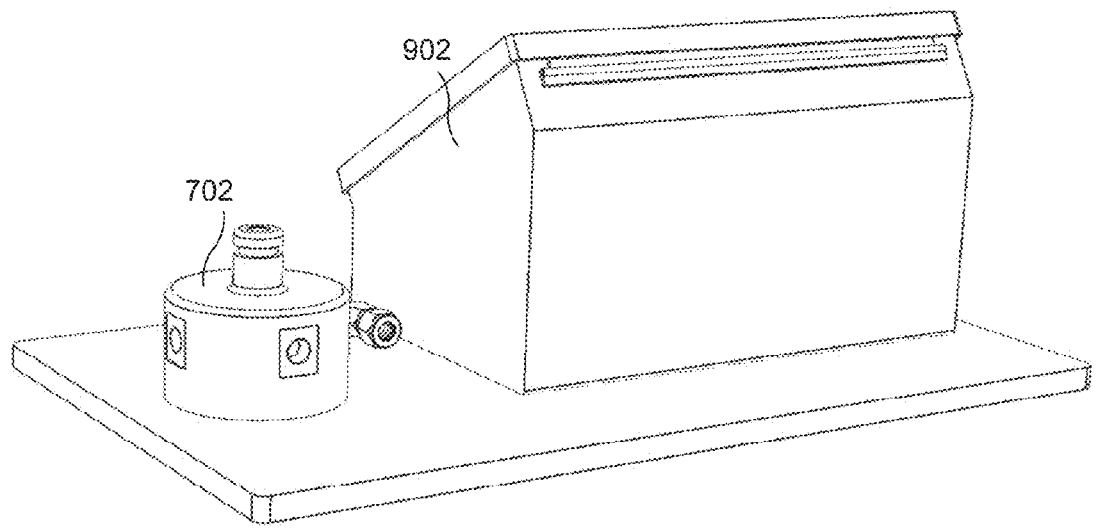
FIG. 25 is a perspective view of a cartridge leak check (test) station and a vacuum test base.

FIG. 25 shows a vacuum test base 702 as used for the leak test station and a console 902. A console may be used to house controls to monitor testing. Controls may be used for things such as vacuum levels, leak rate, timer, and of/off switches, etc.

Figure 18:
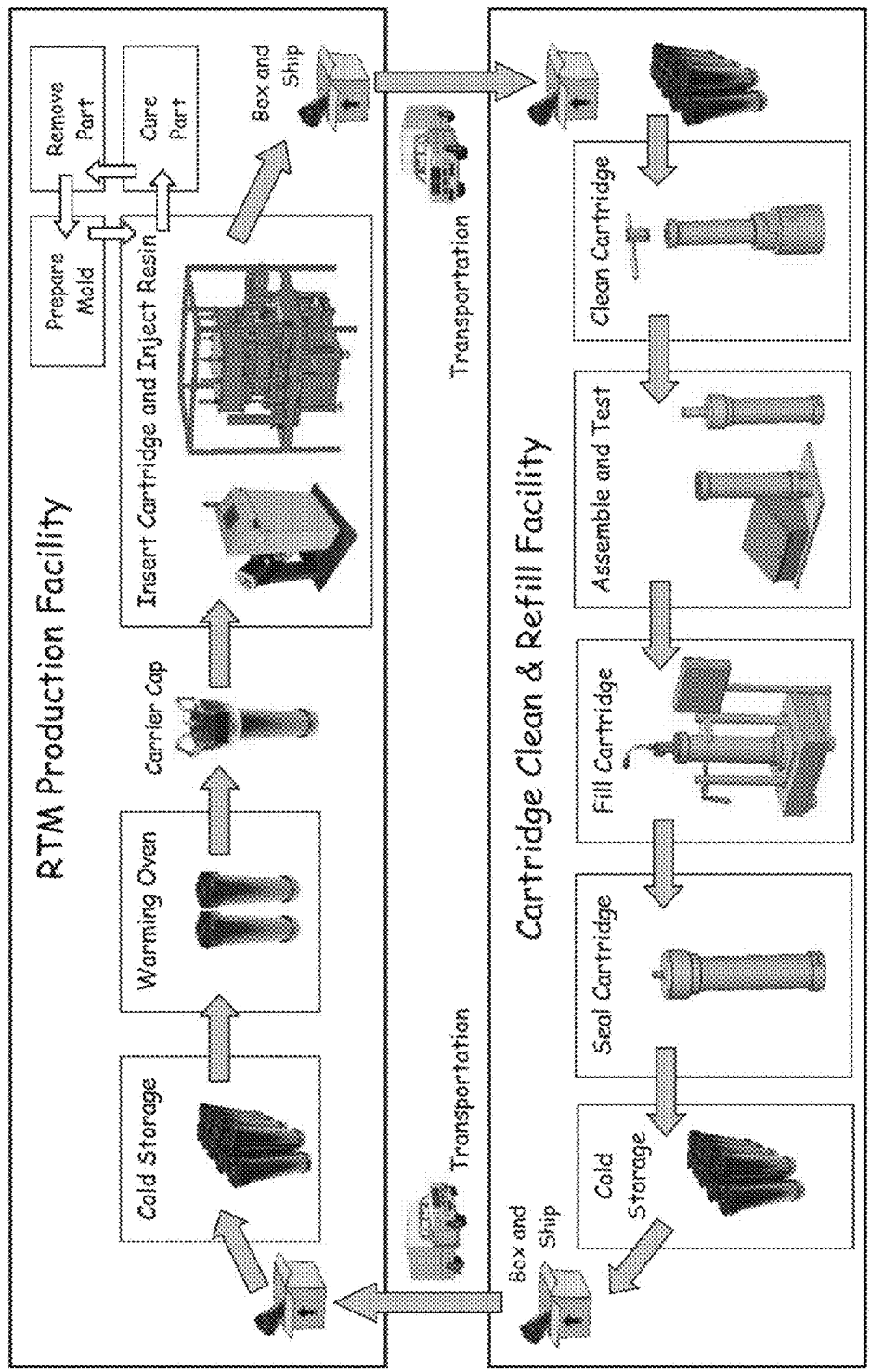
FIG. 18 is a flowchart diagram depicting the process by which a cartridge is cleaned, refilled, and reused.

Referring to FIG. 18, a flowchart shows the life cycle of a cartridge 102 that may include cleaning, refilling, sealing, receiving, storing, assembling, and transporting the cartridge 102.

An overview of the process described below may have steps in order that vary from the order listed. One or more processes may be completed by human or mechanical operation. The steps may be performed in a different order than what is provided. Also, one or more steps may be omitted. Finally, additional steps may be added to the steps provided.
  Clean the Cartridge
  Cleaning the cartridge can include:
Remove piston and end plug,
Clean resin from parts,
Assemble piston and end plug in cartridge,
Assemble and test the cartridge,
Test cartridge seals,
Fill cartridge with a measured amount of prepared and degassed resin,
Seal the cartridge with the end plug cap.
  Place Cartridge in Cold Storage.
  Transport the cartridge to an RTM Production Facility. Shipping container may facilitate cold storage. This may include the use of dry ice or other cold mediums. Embodiments also include that the container be held in cold storage. Workers warm the resin cartridge, place it in an injector, and inject the resin into a mold during the RTM process.
Workers at the RTM production facility place the empty cartridges into boxes and ship them back to the
  Cartridge Refill Facility.
Return shipping requirements may require;
Specialized shipping container to avoid damage during transit.
Shipping container for returning ship may be the same used to ship filled containers to the facility,
  At the clean and refill facility, the empty cartridges are remove from shipping containers and placed in the queue for cleaning.
    Receiving Requirement:
    Cartridge should have means of serial number identifications which could include one or more; engraving; tags, RFID, data/part tracking system capable of following cartridge throughout the entire refill process, and require data acquisition system throughout plant
    Conveyor systems for transport cartridges through cleaning, assembly, test, refill, sealing, and shipping. This might include one or more of a conveyor system, data entry at multiple stations, handling equipment at different stations, and cartridge may go to heated oven to cure resin remaining in cartridge prior to clean. This may require a curing oven with racks to hold cartridges.
    Clean Cartridge
    Unlock piston—rotate 90°—Note: Unlocking and removing the piston is quick and efficient because of the synergy created by the unique design features. The unique design of the piston stop tab in the cartridge, the piston, piston locking plate and locking plate tab allow the quick unlocking and removal of the piston (and end plug) for an efficient cleaning process.
    Extract Piston and End Plug
Note: Cylinder and piston design allows vacuum to be used for extraction.
    Clean the Cartridge, Piston, and End Plug.
Several different methods can be used. Using a vacuum is one suitable method. This can be accomplished by inverting the cylinder and placing it on a special cleaning apparatus, and drawing a vacuum on the cylinder. Vacuum pulls the piston down, wiping the inner surface clean. Vacuum continues to draw the piston down, pulling both the piston and end plug out.
  Other suitable systems for cleaning include:
cleaning all surfaces with solvent,
dry blasting where a blasting nozzle shoots particles of dry ice which freezes the resin and blasts it off of the surface,
curing the resin, after curing the resin flakes off the cartridge surfaces, and wiping surfaces clean.
  A suitable systems for cleaning would suitably include;
Apparatus to receive cartridge,
Tooling or fixturing to orient and position the cartridge, Robotics or automation equipment may be used to do this,
Apparatus to unlock piston,
Apparatus to extract piston and end plug,
Apparatus to position piston, cartridge, and plug prior to clean,
Apparatus to contain resin during cleaning
  Further for the cleaning apparatus may include:
Automation equipment,
Robotics,
Manual tooling and labor,
  Assemble and Test Cartridge
  Assembling and testing the cartridge suitable includes;
Install o-rings (new or cleaned),
Install piston,
Lock piston, Note: Piston and cartridge features work together to facilitate the quick 90° lock and unlock feature.
Install end plug,
Place the inverted cartridge assembly on the vacuum test base. Note: The test stand has a quick connect feature. No tools are needed to attach the cylinder to the test stand because the vacuum connect has the same type of (o-ring) quick connect as the end plug. The test station connection fits right into the end plug.
  Assembly and Test Requirements may include;
Manual tooling or equipment for installation of o-rings on piston and end plug,
Installation of the piston may be done by vacuum, tooling, equipment (manually or automatically operated),
Installation of the piston may be done by tooling or equipment (manually or automatically operated),
Testing by quick connect/disconnect either manually or automatically.
This requires the use of quick connect features on the cartridge,
Log test data and reject/accept cartridge (manually or automatically),
Rotate the piston 90° to lock it.
If it passes the test, it goes to the fill station.
  Fill Cartridge
Place assembled cartridge on the fill station.
Place fill cap on cartridge. Note: The fill station cartridge connection has the same type of (o-ring) quick connect as the cylinder end plug, providing a quick connection that seals and holds a vacuum on the cylinder.
Draw a vacuum on the cartridge. This reduces the possibility of trapping air inside of the cartridge. Note: The piston locking plate tab engages with the piston stop tab in the cartridge to hold the piston in place while the cylinder is under vacuum.
Pump resin into the cartridge.
Measure the Resin Volume. Note: Resin degassing can be conducted prior to filling the cartridge (such as in a batch process), or it can be done after resin is in the cartridge. The vacuum in the cartridge assists resin flow.

Resin volume injected into the cartridge can be measured by a variety of methods.
Determine volume by weight. The fill station can have a scale for this purpose.
Measure volume by resin pump displacement.
Inject a pre-measured volume such as dispensing from a measured container.
Various other volume measurement methods are suitable.
Requirements for Filling
Filling requirements may suitably include,
Apparatus to measure/meter resin volume,
Apparatus to degas resin in an efficient method such as by, for example, batch processing, or multiple individual cartridge degassing stations.
Method of attaching filling equipment quickly to cartridge
Inventory system for tracking on incoming raw material (resin)
Cold storage for raw material (resin) storage
Equipment for the preparation of resin prior to use at the degas/metering devices.
An exemplary degassing process may include;
Heat cartridge,
Open cartridge,
Load cartridge into degas/metering device,
Data entry for tracking of resin processes including (time, temperature, manufacturers lot number).
Degassing systems may also include;
Containers for handling batches of resin,
Could be portable for transport through facility to different stations (i.e. degas, fill),
Apparatus Can be dual purpose for both degassing and to act as filling reservoir.
Transfer of resin to cartridge may suitable be accomplished by one or more systems including;
Pumping
Pressurization of container
Reciprocating pistons
Measurement of resin requires
Weighing equipment
Volumetric measuring equipment
Data acquisition for recording resin fill volume
Quality control equipment for certifying resin filled into cartridge is not contaminated or out of spec,
Testing equipment/lab for quality control of resin properties
Seal the Cartridge
The cartridge is sealed as follows;
Place the cap insert device on the cartridge and draw a vacuum. Insert the end plug cap. A plunger may be used to insert a cap into the end plug outlet. (cap can be disposable or reusable). The plunger extends inside the cap and inserts the outlet cap.
Vacuum draws the outlet cap into the cartridge. The end plug cap provides a vacuum seal against air and moisture during storage. Cap can maintain a vacuum seal to protect against air moisture, etc.
Requirements for Sealing
A suitable system for a sealing system may include,
Apparatus to draw vacuum on cartridge while inserting sealing cap.
Plugs which can be prepared with quick sealing features and quick connection to the cartridge. This may include press fit or expanding materials (i.e. rubber, plastics)
Place the Cartridge in Cold Storage
The cartridge may be placed in a freezer for storage.
Requirements for Cold Storage
A cold storage system may suitable contain one or more;
Automated or manual packaging equipment,
Data entry to record cartridges in inventory,
Temperature tracking device included with each shipping container,
Refrigerated storage large enough for forklift/heavy transport devices,
Means of identifying each shipping container both visual and electronic,
Mukluks, mittens, beanies,
Placing cartridge in shipping container
Ship the Cartridge to the RTM Production Facility
Place cartridges in special shipping containers for cold transport to the RTM production facility.
Requirements for Shipping
Requirement for shipping may include;
Cold transportation by means of refrigerated truck or addition of dry ice to shipping container,
Quality tracking system and printed/electronic documentation which goes with shipping container

What is claimed is:

1. An apparatus comprising an injection cartridge apparatus and an injector base system:
the injection cartridge apparatus comprising
a barrel configured to withstand high pressure and/or high vacuum at elevated temperatures, the barrel having a cylindrical internal circumferential surface enclosing a hollow interior with a proximal end and an open distal end,
the proximal end having structure with a reversibly sealable outlet to selectively seal or provide access to the hollow interior of the barrel;
piston within the barrel that can be longitudinally moved along a portion of the cylindrical internal circumferential surface
such that a portion of the hollow interior between the proximal end and the piston changes volume by movement of the piston,
the piston and the barrel having locking structure with a locked position and an open position, where the locked position prevents movement of the piston in barrel, and the open position allows movement of the piston in the barrel;
the injector base system comprising
cartridge housing for receiving and holding the removable cartridge in a locked position,
injector cap that reversibly locks the removable cartridge in the cartridge housing,
the injector cap including injection line structure that communicates with the outlet in the proximal end of the cartridge,
the injector cap including structure such that when the removable cartridge is reversibly locked, the unlocked position of the locking structure of the removable cartridge is selected to allow movement of the piston in the barrel,
an actuator for applying longitudinal force to the piston and having a rod end structure for engaging the locking structure on the piston to move the locking structure from the locked position to the open position.

2. An apparatus of claim 1, wherein the piston is rotatable around a longitudinal axis to selectively move the locking structure between the locked position to the open position, and the actuator has structure wherein the actuator can rotate the piston.

3. The apparatus of claim 1 wherein the proximal end structure includes a separate end plug
with the reversibly sealable outlet in the end plug with the end structure removably received into the proximal end.

4. The apparatus of claim 3 wherein the end plug is a carrier cap that is removably locked at the proximal end.

5. The apparatus of claim 1 wherein the proximal end structure is fixed and nonremovable and includes the reversibly sealable outlet.

6. The apparatus of claim 1 wherein the reversibly sealable outlet is sealed by a cap.

7. The apparatus of claim 1 additionally comprising a carrier cap removably locked at the proximal end structure over the reversibly sealable outlet in the end structure and includes handling structure.

8. The apparatus of claim 7 wherein the carrier cap includes a lock lever that has a locked position that fixes the carrier cap to the barrel and an unlocked position that releases the carrier cap from the barrel.

9. The apparatus of claim 1 wherein the locking structure of the piston includes structures that extend from a locking plate affixed to and end of the piston toward the distal end, the locking plate having a key opening.

10. A injection apparatus comprising a removable cartridge and an injector base system:
the removable cartridge comprising
a barrel configured to withstand high pressure and/or high vacuum at elevated temperatures,
the barrel having a cylindrical internal circumferential surface enclosing a hollow interior with a proximal end and an open distal end, and one or more stop tab structures near the distal end that extend from the internal circumference surface of the barrel into the hollow interior;
the proximal end having structure with a reversibly sealable outlet to selectively seal or provide access to the hollow interior of the barrel;
piston within the barrel that can be longitudinally moved along a portion of the cylindrical internal circumferential surface
such that a portion of the hollow interior between the proximal end and the piston changes volume by movement of the piston,
the piston having locking structure such that when the piston is longitudinally rotated the locking structure can be moved relative to the stop tab structures between a locked position and an open position,
the locked position where the tab structures and locking structure are aligned to prevent movement of the piston,
the open position where the tab structure and locking structures are aligned to allow movement of the piston,
the injector base system comprising
cartridge housing for receiving and holding the removable cartridge in a locked position,
injector cap that reversibly locks the removable cartridge in the cartridge housing,
the injector cap including injection line structure that communicate with the outlet in the proximal end of the cartridge,
the injector cap including structure such that when the removable cartridge is reversibly locked the removable cartridge is rotated relative to the cartridge housing,
an actuator for applying longitudinal force to the piston and having a rod end structure for rotating the piston locking structure such that the relative rotation of the removable cartridge to the cartridge housing causes a rod end structure to rotate the piston to selectively align the one or more stop tabs and the piston locking structure, which allows longitudinal movement of the piston in the barrel.

11. The injection apparatus of claim 10 wherein the locking structure of the piston includes structure that extends from a locking plate affixed to an end of the piston toward the distal end, the locking plate having a key opening, and wherein the actuator includes actuator rod end structure configured to be aligned and inserted within the key opening.

12. The cartridge apparatus of claim 11, wherein the actuator rod includes a release lock and a quick latch lever, the release lock being activated by the quick latch lever when the actuation rod is properly inserted into the key opening and causing engagement of inner walls of the lock plate and thus locking the piston onto the actuator.

13. The injection apparatus of claim 10 wherein the cartridge housing includes one or more heater sleeves that surround at least a portion of an exterior surface of the barrel of the cartridge when the cartridge is in the locked position.

14. The injection apparatus of claim 10, wherein longitudinal movement of the piston is allowed by an unlocked position in which the radially extending structures of the locking plate are not in contact with the distal stop tabs, and wherein longitudinal movement of the piston is restricted by a locked position in which the radially extending structures of the locking plate are in contact with the distal stop tabs, the rod end inserted within the key opening such that a rotational axial movement of the barrel causes the barrel to move relative to the locking plate between the unlocked position and the locked position.

15. The injection apparatus of claim 10, wherein the cartridge housing has at least one housing sleeve in which the cartridge is mounted where the housing sleeve includes an open position in which the cartridge is mounted either in the locked position and the barrel is exposed by the housing sleeve, or a closed position in which the barrel is mounted in the unlocked position and enclosed by the housing sleeve, and wherein a change between the open and locked position is enabled by engaging the injector cap to the injector housing and by performing a simple axial twist of the injector cap relative to the injector housing.

16. The injection apparatus of claim 15, wherein the at least one housing sleeve is insulated with a Teflon lining.

17. The injection apparatus of claim 10, wherein engagement of the injector cap to the injector housing includes a first position of alignment of at least one alignment face on the injector cap with alignment structure on the barrel, and rotation of the injector cap includes at least one injector cap locking tab becoming aligned with at least one injector housing tab receiver for securement.

* * * * *